A. KARPENKO.
POTATO PLANTER.
APPLICATION FILED DEC. 30, 1919.

1,389,363.

Patented Aug. 30, 1921.
2 SHEETS—SHEET 1.

INVENTOR.
Archip Karpenko
BY George C. Heinicke
ATTORNEY.

A. KARPENKO.
POTATO PLANTER.
APPLICATION FILED DEC. 30, 1919.

1,389,363.

Patented Aug. 30, 1921.
2 SHEETS—SHEET 2.

INVENTOR.
Archip Karpenko
BY
ATTORNEY.

UNITED STATES PATENT OFFICE.

ARCHIP KARPENKO, OF NEW YORK, N. Y.

POTATO-PLANTER.

1,389,363.   Specification of Letters Patent.   Patented Aug. 30, 1921.

Application filed December 30, 1919. Serial No. 348,300.

*To all whom it may concern:*

Be it known that I, ARCHIP KARPENKO, a citizen of Russia, residing at New York, county of New York, and State of New York, have invented certain new and useful Improvements in Potato-Planters, of which the following is a specification.

This invention relates generally to agricultural implements particularly to a machine adapted for use in planting potatoes or the like, although features thereof may be employed for various purposes.

The invention has for an object to provide a device of this kind which will operate both as a cultivator and seeder and which will be characterized by simplicity of construction and positiveness of action.

A further object of the invention is to provide an improved means for feeding the cut potatoes constituting the seed from the hopper to the discharge point.

For further comprehension of the invention, and of the objects and advantages thereof, reference will be had to the following description and accompanying drawings, and to the appended claim in which the various novel features of the invention are more particularly set forth.

Figure 1 of the drawings is a plan view of a potato planter constructed according to my invention.

Figure 1:
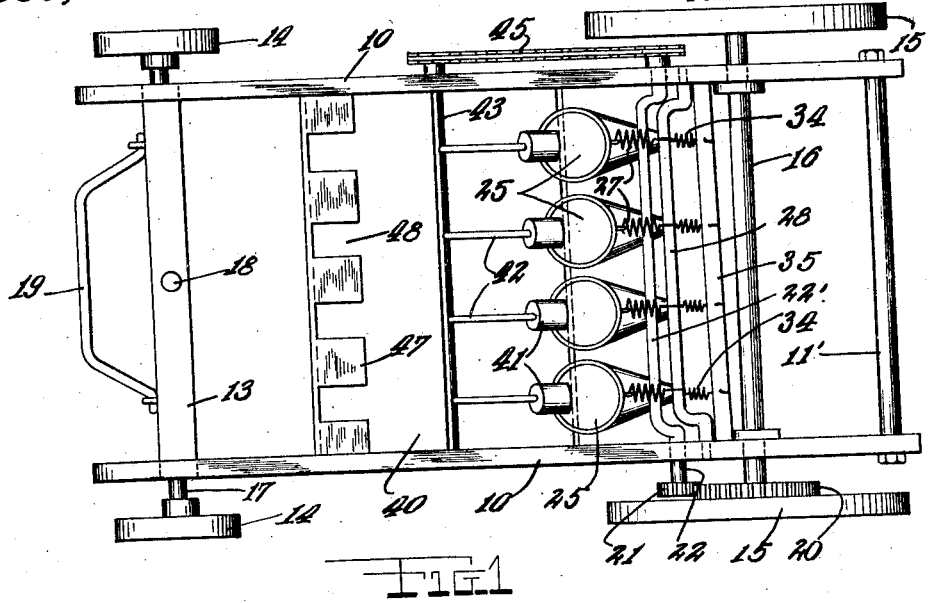
Figure 2:
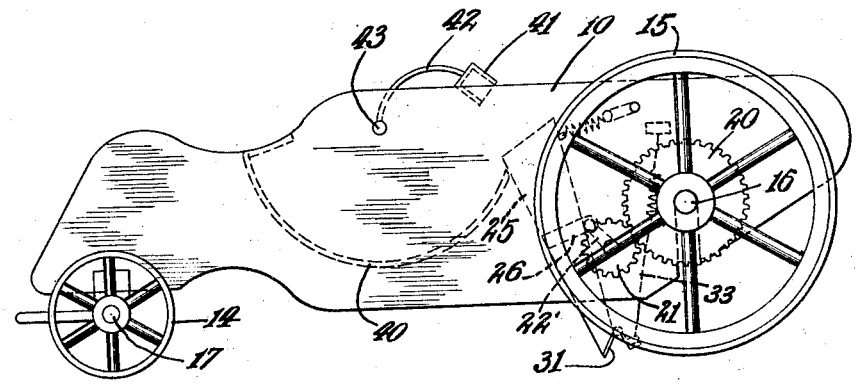
Fig. 2 is a side elevation thereof.
Figure 3:
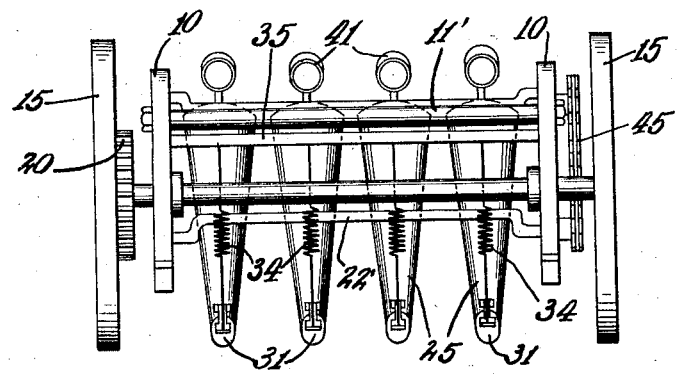
Fig. 3 is a rear view thereof.
Figure 4:
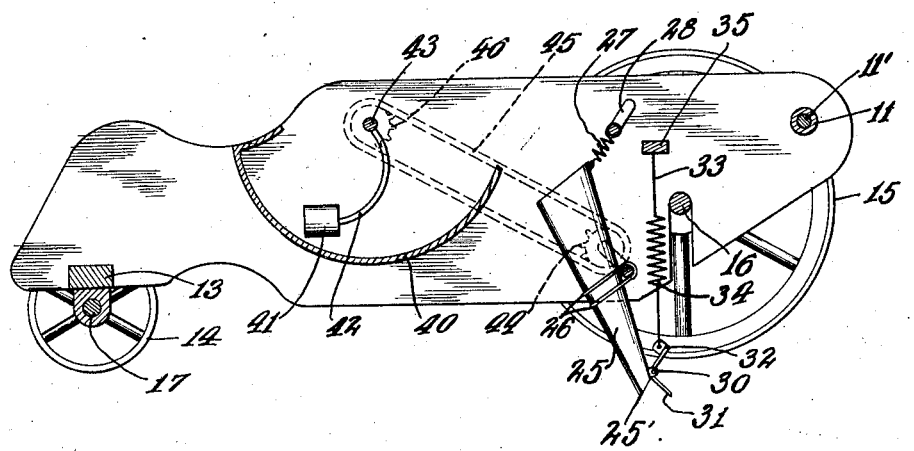
Fig. 4 is a central longitudinal section thereof.

As here shown the device comprises a frame consisting of a pair of side plates 10 rigidly braced at their rear ends by a rod 11 passing through a sleeve 11′, and at their front ends by a cross bar 13. This frame is mounted on front and rear wheels 14 and 15 respectively, the rear wheels being fixed on a shaft or axle 16 suitably journaled in the side plates. The front wheels are loose upon the ends of an axle 17 secured to the cross bar 13 to swing thereon, by a king-bolt 18. This front axle has secured thereto an angular strap 19 or other suitable device, for the attachment of the ordinary draft gear.

Fixed to the shaft 16, between one of the wheels and the adjacent side plate 10, is a gear 20 which meshes with a pinion 21 on the end of a shaft 22 which is journaled in the side plates 10 and has the portion thereof extending between the latter offset as at 22′, providing in effect a series of crank members whereby movement is imparted to a series of devices which act both as cultivators and planters.

These devices comprise the funnel-like elements 25 arranged in a row transversely of the machine and extending in a generally downwardly and rearwardly inclined direction, being secured to the cranked shaft 22′ approximately midway of their lengths by means of straps or rods 26 which pass therearound and around the shaft, these funnels tapering from their upper to their lower ends. Attached at one end to the upper end of each of the elements 25, is a tension spring 27, the opposite ends of these springs being connected to a cranked rod 28 extending between the side plates 10 and rotatably mounted at its ends therein.

Pivoted as at 30 on the lower end of each of the elements 25 is a door 31 adapted to normally close the lower end thereof, this door having an angular arm 32 fixed thereto, to which is connected the lower end of a wire 33 in which is a tension spring 34, this wire being fastened at its upper end to a cross bar 35 extending between the side plates 10. These wires 33, in addition to controlling the doors 31 as will be presently pointed out, also act in conjunction with the springs to keep the elements inclined in the proper direction. As shown in the drawings the lower ends of the funnel like elements 25 are cut off diagonally to incline upwardly and rearwardly leaving a tooth-like point 25′ on the front thereof, which point may be suitably reinforced and hardened and sharpened to act as a cultivator tooth.

The seed to be planted, in this case cut potatoes, is carried in a hopper or receptacle 40 extending between the side plates 10 a short distance in front of the shaft 22, this hopper being of substantially semicircular shape as seen in the longitudinal section Fig. 5, with the top thereof open. The seed is delivered from this hopper to the elements 25 by means of a series of cup-like scoops 41 which are mounted on the ends of curved arms 42 fixed to a shaft 43 extending between the side plates concentric to the bottom of the hopper.

This shaft 43 is suitably journaled in the side plates 10 and is adapted to be rotated by means of a sprocket wheel 44 fixed on the other end of the crank shaft 22 to that carrying the pinion 21, and connected by a sprocket chain 45 to a sprocket wheel 46 fixed on one end of shaft 43. To prevent seed being thrown out of the hopper by the scoops 41 a baffle flange 47 is attached to the forward edge thereof, this flange having a series of notches 48 therein which permit of passage of the scoops.

In operation, the rotation of the rear wheels 15, rotates crank shaft 22 by means of gear 20 and pinion 21. The funnel-like elements 25 which move bodily with the cranked portion 22' of this shaft, will be moved forwardly when in their lowered position, causing the point 25' to dig into the ground. As they swing forward the pull of spring 34 will open the door 31 permitting the seed in the funnel to fall into the depression made by the point. The seed is delivered into the funnel elements 25 by the scoops 41 which move through the hopper at each forward movement thereof, the parts being so proportioned that the upper ends of the funnels 25 come to a position adjacent the rear edge of the hopper as the scoops move downwardly so that the seed which has just been picked up is delivered into the funnels.

Having thus described my invention, what I claim as new and desire to protect by Letters Patent of the United States is as follows:

In a potato planter of the character described, embodying a crank shaft, a plurality of funnel elements, tension springs secured with one of their ends to said funnel elements and with the other to said crank shaft, doors for normally closing the lower ends of said funnel elements, angular arms secured to said doors, and wires embodying tension springs, secured to said doors and to the front of the planter for keeping said elements in their proper inclined positions.

In testimony whereof I have affixed my signature.

ARCHIP KARPENKO.